United States Patent [19]

Childs et al.

[11] 4,047,567

[45] Sept. 13, 1977

[54] OIL WELL CEMENTING PROCESS

[75] Inventors: Jerry D. Childs; Roosevelt Love, both of Duncan, Okla.

[73] Assignee: Halliburton Company, Duncan, Okla.

[21] Appl. No.: 654,497

[22] Filed: Feb. 2, 1976

[51] Int. Cl.$^2$ .......................... C04B 7/02; C04B 7/35; E21B 33/14
[52] U.S. Cl. ..................... 166/293; 106/90; 106/315; 260/124 A
[58] Field of Search ................. 166/293, 292; 106/90, 106/315; 260/124, 124 A

[56] References Cited

U.S. PATENT DOCUMENTS

| 2,674,321 | 4/1954 | Cutforth | 166/293 |
|---|---|---|---|
| 2,676,170 | 4/1954 | Patterson et al. | 260/124 |
| 2,680,113 | 6/1954 | Adler et al. | 260/124 |
| 2,775,580 | 12/1956 | Scarth | 260/124 |
| 3,053,673 | 9/1962 | Walker | 106/90 |
| 3,296,159 | 1/1967 | Lissner | 260/124 R |
| 3,634,387 | 1/1972 | Dougherty | 260/124 R |
| 3,662,830 | 5/1972 | Martin | 166/293 |
| 3,723,145 | 3/1973 | Haldas et al. | 106/315 X |
| 3,772,045 | 11/1973 | Haldas et al. | 106/315 X |
| 3,821,985 | 7/1974 | George | 166/293 |

*Primary Examiner*—Stephen J. Novosad
*Attorney, Agent, or Firm*—Robert S. Nisbett; Thomas R. Weaver; John H. Tregoning

[57] ABSTRACT

Oil well cementing compositions and processes are produced using a high efficiency sulfoalkylated lignin retarder composition and modifications thereof to produce cement compositions without gelation problems, having high early strength and with precisely controllable setting time.

3 Claims, No Drawings

OIL WELL CEMENTING PROCESS

This invention relates to cement compositions and more particularly to the use of hydraulic cement compositions for sealing or cementing subterranean zones or subterranean zones penetrated by a well such as cementing the annular space in an oil well between the surrounding formation and casing. In particular the invention relates to an improved hydraulic cement composition for cementing zones at elevated temperatures in which the setting time of the cement composition is controlled or extended by the addition of a highly efficient non-gelling retarding agent which produces a hydraulic cement composition having a degree of predictability for the setting time.

Typically, the subterranean zones are cemented or sealed by pumping an aqueous hydraulic cement slurry into the zone. In cementing the annular space of an oil well, the cement slurry is pumped down the inside of the casing and back up the outside of the casing through the annular space. Any cement slurry remaining in the casing is displaced and segregated using plugs and an aqueous displacement fluid. Frequently the high temperatures encountered in subterranean zones will cause premature setting of the hydraulic cement. This requires additives which extend or retard the setting time of the cement slurry so that there is adequate pumping time in which to place and displace the aqueous cement slurry in the desired zones. Previously known retarding agents are frequently unpredictable, typically produce erratic results with different brands of cement and frequently cause premature gelation of the cement slurry. Gelation refers to an abnormal increase of viscosity of the aqueous cement slurry to a value without a significant increase in the compressive strength of the cement composition. This increase in aqueous cement slurry viscosity makes the slurry difficult or impossible to pump at a viscosity of 70 poise or above which is defined as the set point herein. The cement composition has not attained an adequate compressive strength.

Prior art cement compositions and additives are described in the following list of 14 patents:

U.S. Pat. No. 2,549,507 to Morgan et al
U.S. Pat. No. 2,579,453 to Post et al
U.S. Pat. No. 2,674,321 to Cutforth
U.S. Pat. No. 2,676,170 to Patterson et al
U.S. Pat. No. 2,680,113 to Adler et al
U.S. Pat. No. 2,775,580 to Scarth
U.S. Pat. No. 2,872,278 to Putnam et al
U.S. Pat. No. 3,034,982 to Monroe
U.S. Pat. No. 3,053,673 to Walker
U.S. Pat. No. 3,135,727 to Monroe
U.S. Pat. No. 3,344,063 to Stratton
U.S. Pat. No. 3,748,159 to George
U.S. Pat. No. 3,766,229 to Turner
U.S. Pat. No. 3,821,985 to George.

Fundamentals of oil well cementing are described in the book PETROLEUM ENGINEERING DRILLING AND WELL COMPLETIONS, by Carl Gatlin, Prentice Hall, 1960. Background of and information on hydraulic cement compositions and additives can be found in the following books:

LIGNIN STRUCTURE AND REACTIONS, ADVANCES IN CHEMISTRY SERIES, 1959, American Chemical Society, 1966;

MECHANICAL BEHAVIOR OF HIGH POLYMERS, by Turner Alfrey, Interscience Publishers, 1948; and HACKH'S CHEMICAL DICTIONARY, 4th Ed., McGraw-Hill, 1969.

The above references and information cited therein are incorporated herein by reference to the extent necessary.

The hydraulic cement compositions of this invention solve or eliminate many of the problems pointed out above. The hydraulic cement compositions of this invention do not have the gelation problem; the retarder composition is more efficient than prior art retarder compositions, the retarder has less variation with different brands of cement; cement compositions have much better predictability or reproducibility of setting times with a given brand of cement; and hydraulic cement compositions have better rheology characteristics. Thus the improved cement compositions of this invention have practically eliminated the problems of unpredictability and irreproducibility of results which are particularly severe in high pressure deep wells where the temperatures may exceed 300° F and 15,000 PSI.

The concentration of retarder composition of this invention required to produce the desired pumping time for or delay in setting of a cement slurry at a given circulating temperature is not as critical as with conventional lignosulfonate retarders. The thickening time at a given retarder concentration is less temperature dependent than with conventional retarders. This reduces the possibility of over retarded slurries at cooler temperatures encountered at the top of long liners or tie back strings. The retarder compositions of this invention provide the desired pumping times and allow earlier strength development. When cementing long strings this can reduce the WOC (waiting on cement to set) time by 8–12 hours. Thus, the retarder compositions of this invention are more predictable in performance than conventional lignosulfonate retarders especially with various brands of cement. The compositions of this invention act not only as retarders but also as a dispersing agent which can reduce fluid loss from gel type or high clay cement slurries. When the retarder composition of this invention is blended in a cement slurry, viscosity of the slurry decreases slightly and remains constant or does not increase significantly until the cement begins to set. This improvement in rheology or viscosity characteristics with improved predictability makes use of the compositions much easier than with conventional retarders. In addition, the retarder compositions of this invention are generally non-toxic, non-flammable, non-hazardous; compatible with cements, other additives and with most other well fluids and mix readily in aqueous systems with minimum agitation.

The high efficiency, non-gelling cement retarder composition of this invention has a high degree of predictability for controlling rheology and setting time of hydraulic cement comprising a low molecular weight sulfoalkylated lignin which is substantially sulfoalkylated in the lignin molecule at positions on the benzene ring which are ortho to the phenolic hydroxyl group. In the sulfoalkyl group the sulfonic acid group ($-SO_3H$) is connected to the ortho position on the benzene ring by a methylene or substituted methylene groups. This methylene or substituted methylene group is referred to herein as an alkylidene radical having one to five carbon atoms. This alkylidene radical with sulfonic acid radical can be represented by the formula ($-R-SO_3H$)

wherein R is the methylene group or alkyl portion having one to five carbon atoms and preferably one to three carbon atoms.

The unexpected properties of this retarder are thought to be due to the differences in average molecular weight or average molecular size and molecular structure. The evidence showing these differences is illustrated in the examples which show the unexpected properties. The sulfoalkylated lignin of this invention is a low molecular weight material having an average molecular weight or molecular size in the range of about 2,000–10,000 and preferably about 3,000–5,000. It is also thought to have a narrow molecular weight distribution. Prior art lignosulfonate compounds have a molecular weight or molecular size of about 10,000 and higher and the sulfonate substituent or radical attached directly on the carbon atom of the lignin molecule which is in the alpha position of the phenyl propyl side chain. This phenyl propyl or aliphatic chain is attached at a position on the benzene ring which is para to the phenolic hydroxyl group discussed herein. For lignosulfonate the phenolic hydroxyl group can be replaced by an alkoxy group as indicated by $R_1$—Ph—$OR_2$ wherein $R_1$ is the phenyl propyl side chain, Ph is phenyl or the benzene ring and $R_2$ is hydrogen or alkyl. The sulfoalkylated retarder composition of this invention has substantially all of the sulfoalkyl group (i.e., —R—$SO_3H$) in the position ortho to the phenolic hydroxyl group of the benzene ring of the lignin molecule.

The sulfoalkylated lignin retarder of this invention does not have a significant degree of sulfonation at the alpha carbon atom as do the prior art lignosulfonates. Thus, the sulfoalkylated lignin retarder of this invention is an entirely different chemical composition as shown by the unexpected and significantly different properties shown herein. The sulfoalkylated lignin retarder of this invention can be considered to be a sulfoalkylated lignin of high purity, low molecular weight with a narrow molecular weight distribution. This is thought to be due to the significantly different procedure used for its preparation.

The sulfoalkylated lignin retarder for compositions of this invention can be prepared by catalytic oxidation of the sulfite liquor from a wood pulping process. This oxidation removes polysaccharides and wood sugars and substantially desulfonates the lignin molecule which is recovered as a residue. This purified lignin is separated from the liquor. The high purity, low molecular weight lignin molecule is then substantially sulfoalkylated by the addition of sulfonating agent such as sodium sulfite in the presence of an aldehyde or ketone having one to five carbon atoms at about 150°–190° C and 180–220 atmospheres. In this process, the aldehyde or ketone furnishes the alkylidene group which attaches at a vacant ortho position on the benzene ring in the lignin molecule and connects the sulfonate group through a methylene radical to the benzene ring at a position ortho to the free phenolic hydroxyl group. Some benzene rings may have more than one sulfoalkyl group attached and some benzene rings may have no sulfoalkyl substituents. The sulfur content of the sulfoalkylated lignin is between about 3–10% and preferably 3–8%.

This sulfonate group can be in the form of the acid, a salt or combinations thereof. The salt can be in the form of ammonium or metal salt involving an alkali metal; an alkaline earth metal; or metals such as iron, copper, zinc, vanadium, titanium, aluminum, manganese, chromium, cobalt or nickel; or combinations thereof. The salts which are readily soluble in aqueous systems, such as those of the alkali metals, sodium and potassium, are preferred although the salts of alkaline earth metals and other metals can be used under certain circumstances.

The alkyl portion of the sulfonate substituent is derived from the aldehyde or ketone used in the sulfoalkylation step. Formaldehyde is a preferred alkyl source because it simply connects the sulfonate group to the ortho position by a one-carbon atom methylene group. Acetone would produce an alkylidene group having a methyl group on each side of the methylene group; methyl ethyl ketone would result in a methyl and an ethyl alkyl group attached to the methylene group; and propionaldehyde would result in an ethyl group attached to the methylene bridge. Theoretically, any aldehyde or ketone could be used for forming the alkylidene radical but the stereo chemistry and solubility must be considered in selecting the size and configuration of the aldehyde or ketone use for this component. A preferred sulfoalkylated lignin of this invention has a molecular weight in the range of about 3,000–4,000, a one carbon atom alkylidene radical and a sulfur content of about 3–8% by weight.

Another preferred hydraulic cement composition of this invention can be considered to be a modified low molecular weight sulfoalkylated lignin. This modified retarder composition is a combination of the high purity substantially sulfoalkylated lignin described above and at least one water soluble hydroxy carboxylic acid. These hydroxy carboxylic acids have a synergistic effect of increasing the effectiveness and operable temperature range of the basic retarder composition. The preferred carboxylic acids are substantially alphatic carboxylic acids and preferably polyhydroxy carboxylic acids having at least one terminal carboxy group which can be in the form of the acid, a salt or mixtures thereof as described above for the sulfonate groups.

Particularly preferred polyhydroxy carboxylic acids have a molecular weight in the range of about 125–250 and have a hydroxyl group attached to the carbon atom adjacent to the carboxy group as show by the formula

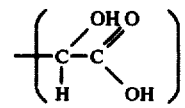

These carboxylic acids include gluconic acid, tartaric acid and equivalents thereof. These equivalents include the various stereoisomers of the above acids particularly the asymmetric or optically active isomers. Thus, the preferred group of hydroxy carboxylic acids are substantially linear aliphatic acids having about 4–10 carbon atoms, and preferably 4–8 carbon atoms. The molecular size and number of hydroxy and carboxylic groups will affect the water solubility. The hydroxy carboxylic acid is preferably present with the sulfoalkylated lignin in a weight ratio of acid to lignin preferably in the range of about 1:0.1–5.0 and preferably in the range of about 1:0.2–3.0.

The hydraulic cement compositions of this invention are typically used in the form of an aqueous slurry of hydraulic cement with a concentration of retarder mixed in the aqueous slurry to control or delay the cement setting time so that it exceeds the pumping time with an adequate safety margin. Sufficient water is added to the slurry to make the composition pumpable. As used herein the hydraulic cement is typically a Portland cement which is set by the water of the slurry in the absence of air which is excluded by placement of the cement in the zone to be sealed. The low molecular weight sulfoalkylated lignin retarder of this invention is preferably present in the aqueous hydraulic cement slurry in a concentration up to about 2%, and preferably up to 1%, by weight based on the dry cement. Higher retarder concentrations and other cement can be used when necessary in unusual circumstances. A deforming agent is typically added as are fluid loss additives, friction reducing additives, salts such as sodium chloride and potassium chloride, weighting additives and other conventional additives as described in the references cited above. Pozzolana cement, high alumina cement or high gel (high clay content) cement can be used for special applications. The low molecular weight sulfoalkylated retarder composition of this invention has high reproducibility and predictability when used with most high quality cements which are typically used in the petroleum industry. However, certain brands which are not manufactured to standard specifications, such as those which are not sufficiently calcined or having varying degrees of free lime remaining in the cement, will produce substantial variations from the standard high quality brands. It is not clear whether the free lime causes the problems or is merely an indication when the problems exist. These variations can be readily determined by preliminary tests which make even these substandard cements readily predictable and may merely require slightly higher retarder concentrations to offset the chemical composition variations of the cement of excess lime content.

In a preferred process for using the non-gelling hydraulic cement composition of this invention having a degree of predictability of setting time and containing the high efficiency retarder, the retarder composition is mixed with the hydraulic cement as an aqueous slurry with the retarder concentration up to about 2% on a dry cement weight basis. The hydraulic cement mixture is pumped without gelation into the zone to be sealed or cemented and the hydraulic cement mixture is maintained in the zone until an adequate compressive strength is attained. In this process the retarder concentration preferably up to about 2% on a dry cement weight basis is calculated to control the setting time of the hydraulic cement slurry to exceed the pumping time within an adequate safety margin. Due to the higher efficiency of the retarder and greater predictability of the hydraulic cementing compositions of this invention, the portion of the safety margin previously required for these variations can be substantially reduced. The safety margin now need primarily allow time only for unexpected equipment difficulties. This reduction in the safety margin time or time which the typical oil drilling rig is waiting for the cement to set can result in a substantial economic advantage due to the higher efficiency and predictability of the hydraulic cement compositions of this invention. The modified low molcular weight sulfoalkylated lignin of this invention or the combination of the sulfoalkylated lignin with the hydroxy carboxylic acids improve the efficiency and predictability of the compositions of this invention even more and therefore are preferably used. The basic sulfoalkylated lignin retarder composition of this invention can be used up to a temperature (i.e., BHCT) slightly in excess of about 210° F and the modified retarder composition containing the hydroxy carboxylic acids can be used up to a temperature of about 400° F.

The molecular weight of the sulfoallkylated portion of the composition of this invention is determined by diffusion techniques. These differences between the sulfoalkylated lignin compositions of this invention and the prior art lignosulfonates are shown by the examples.

The following examples serve to illustrate various embodiments of the invention and enable one skilled in the art to practice the invention. Parts, percentages, proportions and concentrations are by weight unless indicated otherwise.

Samples of calcium (CaLS) and sodium lignosulfonates (NaLS) and a preferred sulfomethylated lignin (SML) composition of this invention were analyzed chemically by spectroscopy using X-ray, infrared, and ultraviolet radiation techniques. The samples were prepared and analyzed by standard procedures such as those described in ABSORPTION SPECTROSCOPY, by Robert P. Bauman, John Wiley & Sons, Inc., 1962, which is incorporated herein by reference to the extent necessary. X-ray diffraction merely showed that both the lignosulfonate and sulfoalkylated lignin were noncrystalline.

Chemical analysis indicated the following constituents by weight:

|      | % C  | % $H_2$ | % Ca | % S |
|------|------|---------|------|-----|
| CaLS | 39.1 | 4.3     | 7.6  | 3.9 |
| NaLS | 42.2 | 4.6     | 0.3  | 7.4 |
| SML  | 45.0 | 3.8     | 0.2  | 6.2 |

The sulfur content of NaLS and SML was thought to include some inorganic sulfur (e.g. $CaSO_4$) entrained from cation exchange or sulfonation liquor.

For ultraviolet (UV) technique which scanned 190–360 millimicrons (m$\mu$) for both NaLS and SML showed a major peak at about 202–205 millimicrons with shoulder or decreasing peaks at about 230 and 310–320 millimicrons. The samples were in water at a 0.02 gram per liter concentration and were run in a one cm path length cell.

The infrared (IR) transmittance scan from 2.5–30 microns or 300–400 $cm^{-1}$ showed peaks at the following wave lengths ($\lambda$) in $cm^{-1}$:

NaLS*3440; 2940; 2840*; 1590; 1495; 1450; 1415; 1250*; 1200; 1140*; 1035; 930*; 640 and 590.

SML: 3440; 2940; 2840; 1675; 1590; 1495; 1450; 1415; 1355; 1250*; 1200; 1140*; 1070; 1035; 930*; 850; 775; 735; 590 and 525.

The starred values (*) are shoulder peaks or peaks which are not very distinct. Samples for the IR scan were mulled in NUJOL mineral oil and run between salt plates.

EXAMPLES

For the following examples each sample was prepared by measuring an 800-gram portion of the designated dry cement into a cylindrical container of approximately 800 milliliters volume. Dry or powdered additives are designated as a percentage of the weight of the dry powdered cement unless indicated otherwise. Dry powdered additives are measured and blended with cement. A portion of tap water equal to the weight percentage of the dry cement is slurried with the dry cement and additives with vigorous mixing. The slurry is stirred for an additional 30 seconds at a high rate.

Liquid additives are blended into the water. Samples were tested according to standard procedures as set forth in API Method RP-10B which is incorporated herein by reference.

For thickening time tests a sample portion is stirred in a container of about 500 milliliters at a temperature and pressure schedule determined by API method RP 10B. The container is heated from ambient temperature under pressure. It contains a direct reading consistometer which is calibrated with a potentiometer calibrating device to read directly in units of consistency (API-RP-10B). The set time or setting point is the time or point at 70 units of consistency or viscosity.

API Method RP-10B provides the following casing schedule for bottom hole circulating temperature (BHCT) and bottom hole static temperature (BHST) at the indicated depths:

| Depth (ft.) | BHCT (° F) | BHST (° F) |
|---|---|---|
| 8,000 (2440 m)* | 125 (51.67° C)* | 200 (93.33° C)* |
| 10,000 (3050 m) | 144 (62.22° C) | 230 (110.00° C) |
| 12,000 (3660 m) | 172 (77.78° C) | 260 (126.67° C) |
| 14,000 (4270 m) | 206 (96.67° C) | 290 (143.33° C) |
| 15,000 (4575 m) | 226 (107.78° C) | 305 (151.66° C) |
| 16,000 (4880 m) | 248 (120.00° C) | 320 (160.00° C) |
| 18,000 (5490 m) | 300 (148.89° C) | 350 (176.67° C) |
| 20,000 (6100 m) | 340 (171.11° C) | 380 (193.33° C) |
| 22,000 (6710 m) | 380 (193.33° C) | 410 (210.00° C) |

*Metric Equivalents

Fluid loss is the number of milliliters or cubic centimeters of liquid forced through No. 50 Whatman filter paper or through 325 mesh screen according to API publication RP-10B (Section 8).

TABLE I
Predictable Behavior

Lone Star Class H Cement
38% H₂O

| SML* | Thickening Times Hours:Minutes API Casing Simulation Tests | | | |
|---|---|---|---|---|
| % Retarder | 8,000' | 10,000' | 12,000' | 14,000' |
| 0.20 | 2:35 | 2:04 | 1:33 | — |
| 0.25 | 4:20 | 2:37 | — | — |
| 0.30 | 5:50 | 3:11 | 2:31 | 1:58 |
| 0.35 | — | 5:20 | — | — |
| 0.40 | — | — | 4:12 | 3:01 |
| 0.50 | — | — | 7:18 | 3:47 |
| 0.60 | — | — | — | 4:09 |
| 0.70 | — | — | — | 5:12 |

Lone Star Class H Cement
46% H₂O

| 0.16 | 2:43 | — | — | — |
|---|---|---|---|---|
| 0.20 | — | 2:25 | 2:15 | 1:55 |
| 0.24 | 3:51 | — | — | — |
| 0.30 | 6:40 | 3:28 | 3:01 | 2:32 |
| 0.34 | — | — | 3:58 | — |
| 0.35 | — | 6:13 | — | — |
| 0.38 | — | — | 4:17 | — |
| 0.40 | — | 11.22 | — | 3:32 |
| 0.44 | — | — | 5:37 | — |
| 0.60 | — | — | — | 6:10 |

*Sulfomethylated lignin retarder.

Increasing the retarder concentration results in corresponding increase in thickening time until a saturation point is reached. Beyond this point, slight increases in the retarder concentration result in greatly increased thickening times.

TABLE II
Set Times Obtained with Commercially Available Calcium Lignosulfonate and the Sodium Salt of Sulfomethylated Lignin[a]

| Retarder | Percent Retarder (by wt. Cement) | Percent Sodium Chloride (by wt. water) | Set Times - Hours:Minutes API Casing Simulation Tests 14,000' – 206° F |
|---|---|---|---|
| Sulfomethylated Lignin | 0.3 | 0 | 1:58 |
| | 0.4 | 0 | 3:01 |
| | 0.5 | 0 | 3:47 |
| | 0.6 | 0 | 4:09 |
| | 0.7 | 0 | 5:12 |
| Calcium Lignosulfonate | 0.3 | 0 | 3:25 |
| | 0.4 | 0 | 4:05 |
| | 0.5 | 0 | 1:34[b] |
| | 0.6 | 0 | 1:35[b] |
| Sulfomethylated Lignin | 0.3 | 18.0 | 1:44 |
| | 0.4 | 18.0 | 2:27 |
| | 0.5 | 18.0 | 2:45 |
| | 0.6 | 18.0 | 3:42 |
| | 0.7 | 18.0 | 4:33 |
| | 0.8 | 18.0 | 5:12 |
| Calcium Lignosulfonate | 0.2 | 18.0 | 1:32[b] |
| | 0.3 | 18.0 | 1:40[b] |
| | 0.4 | 18.0 | 1:48[b] |
| | 0.5 | 18.0 | 2:05[b] |
| | 0.6 | 18.0 | 2:40[b] |

[a]All slurries consisted of 800 grams Lone Star Class H Cement with 304 grams (38%) water, and indicated amounts of additive and sodium chloride.
[b]Slurry gelation was observed, i.e., viscosity reached 70 units of consistency but slurry had not developed significant compressive strength at that time. Others reached a viscosity of 70 units and set with compressive strength at approximately the same time.

AT higher temperatures slurries containing the conventional retarder tend to form unpumpable heavy gels prior to development of significant compressive strength, however, use of the sulfomethylated compound yielded slurries which were well dispersed until final hard set of the cement was obtained. This is illustrated in Table II which lists the set time and percent added retarder for both fresh and salt water slurries containing either the commercially available calcium salt of lignosulfonate or the sodium salt of the new sulfomethylated compound. As noted in the table, many of the slurries containing the calcium salt tended to form heavy gels (i.e., slurry is unpumpable and thus, considered set when the viscosity reaches 70 units of consistency even though it may have gelled with no compressive strength at that time); this results in an erratic dependence of set time on retarder concentration. For example, in the fresh water slurries, increases in retarder concentration in excess of approximately 0.4% (Table II) result in decreased rather than the expected increased set times; this effect is not found for the new compound which shows a reasonable set time increase as the retarder concentration is increased in both fresh and salt water slurries.

Predictable Behavior One Cement to Another

TABLE III
Predictable Behavior One Cement to Another
Effect of Cement Brand on Set Time[a]

| Type of Cement | Additive | Percent Additive (by wt. of cement) | Set Time - Hours:Minutes API Casing 14,000' – 206° F |
|---|---|---|---|
| Lone Star Class H (Maryneal)[b] | Sulfomethylated Lignin | 0.5 | 3:37 |
| Lone Star Class H (Maryneal)[b] | Calcium Lignosulfate | 0.5 | 1:34[h] |
| Lone Star Class H (New Orleans)[c] | Sulfomethylated Lignin | 0.5 | 2:45 |
| Lone Star Class H (New Orleans)[c] | Calcium Lignosulfate | 0.5 | 0:40[h] |
| Trinity Class H[d] | Sulfomethylated Lignin | 0.5 | 2:46 |

TABLE III-continued
Predictable Behavior One Cement to Another
Effect of Cement Brand on Set Time[a]

| Type of Cement | Additive | Percent Additive (by wt. of cement) | Set Time - Hours:Minutes API Casing 14,000'– 206° F |
|---|---|---|---|
| Trinity Class H[d] | Calcium Lignosulfate | 0.5 | 3:02[h] |
| Southwestern Class H[e] | Sulfomethylated Lignin | 0.5 | 3:19 |
| Southwestern Class H[e] | Calcium Lignosulfate | 0.5 | 4:05 |
| Oklahoma Class H[f] | Sulfomethylated Lignin | 0.5 | 3:00 |
| Oklahoma Class H[f] | Calcium Lignosulfate | 0.5 | 3:45[h] |
| Dyckerhoff Class B[g] | Sulfomethylated Lignin | 0.5 | 2:44 |
| Dyckerhoff Class B[g] | Calcium Lignosulfate | 0.5 | 2:45 |

[a]Slurries consisted of 800 grams indicated cement, 304 grams (38%) water (by wt. of cement), and additive with the exception of the slurries containing Dyckerhoff Class B which contained 368 grams (46%) water.
[b]Cement manufactured by Lone Star Industries, Inc., Maryneal, Texas.
[c]Cement manufactured by Lone Star Industries, Inc., New Orleans, Louisiana.
[d]Cement manufactured by Trinity, Portland Cement Division, Dallas, Ft. Worth, Houston, Texas.
[e]Cement manufactured by Southwestern Portland Cement Company, El Paso, Texas.
[f]Cement manufactured by OKC Corporation, Pryor, Oklahoma.
[g]Cement manufactured by Dyckerhoff Zementwerke AG, Wiesbaden-Biebrich, Germany.
[h]These slurries gelled prior to hard set.

At constant concentration of the new retarder, reasonably consistent set times are obtained for slurries containing cements produced by different manufacturers (Table III). This contrasts with the similar results for calcium lignosulfonate which vary drastically from one cement to another.

TABLE IV
Slurry Gelation Effect
Viscosity versus Pumping Time for the Slurries Containing Calcium Lignosulfonate or the Sodium Salt of Sulfomethylated Lignin

| Type of Cement | Additive[d] | Percent Additive | Pumping Times Hours:Minutes 14,000' API Casing – 206° F | Viscosity In Units of Consistency[e] |
|---|---|---|---|---|
| Lone Star Class H (Maryneal) | SML | 0.5 | 0:00 | 9 |
| | | | 0:30 | 6 |
| | | | 0:45 | 6 |
| | | | 1:00 | 6 |
| | | | 1:15 | 6 |
| | | | 1:30 | 6 |
| | | | 2:00 | 12 |
| | | | 2:15 | 21 |
| | | | 3:00 | 26 |
| | | | 3:15 | 29 |
| | | | 3:30 | 31 |
| | | | 3:47[b] | 70 |
| | NaLS | 0.5 | 0:00 | 1 |
| | | | 0:30 | 4 |
| | | | 0:45 | 13 |
| | | | 1:00 | 37 |
| | | | 1:15 | 41 |
| | | | 1:30 | 45 |
| | | | 1:34[c] | 70 |

[a]Slurries consisted of cement, 38% water and additive.
[b]Slurry reached a viscosity of 70 units and set with compressive strength at approximately the same time.
[c]Slurry reached a viscosity of 70 units but had no compressive strength until approximately two hours later.
[d]SML is sulfomethylated lignin and NaLS is sodium lignosulfonate.
[e]Consistency measured directly in units of consistency according to API pulbication RP-10B.

TABLE V
Lower Temperatures
Set Times Obtained with Calcium Lignosulfonate and the Sodium Salt of Sulfomethylated Lignin

| Retarder | Percent Retarder (by wt. Cement) | Set Times - API Casing 10,000' | Hours:Minutes Simulation Tests 12,000' |
|---|---|---|---|
| Sulfomethylated Lignin[a] | 0.3 | — | 2:30 |
| | 0.4 | — | 3:57 |
| | 0.5 | — | 8:00 |
| Calcium Lignosulfonate[a] | 0.3 | — | 3:10 |
| | 0.4 | — | 2:21 |
| | 0.6 | — | 1:40 |
| Sulfomethylated Lignin[b] | 0.08 | 2:58 | — |
| | 0.12 | 3:29 | — |
| | 0.16 | 4:00 | — |
| | 0.20 | 4:50 | — |
| | 0.24 | 6:33 | — |
| Calcium Lignosulfonate[b] | 0.40 | 1:44[c] | — |
| | 0.80 | 3:20[c] | — |

[a]Slurries consisted of Dyckerhoff Class G, 44% water and indicated additive.
[b]Slurry consisted of Longhorn Class H Cement with 44% water, 35% coarse silica flour (60-140 mesh), 0.75% CFR-2 friction reducer and 18% sodium chloride salt. CFR-2 is beta-naphthalene sulfonic acid condensed with formaldehyde and mixed with 10% polyvinyl pyrrolidone. CFR-2 is described in U.S. Pat. No. 3,359,225 which is incorporated herein by reference.
[c]Slurries showed severe gelation effects.

TABLE VI
Compressive Strength
Class H Cement with 38% Water
Retarder Concentration Giving 4.0 Hr. Pumping Time on 12,000 ft. Schedule
Slurries Pumped 2 hrs. on 12,000 ft. Schedule and placed in Autoclaves at Indicated Temperature

| Compressive Strength Using Conventional Lignosulfonate Retarder (PSI) | | | Temperature | Compressive Strength Using SML Cement Retarder (PSI) | | |
|---|---|---|---|---|---|---|
| 8 hrs. | 12 hrs. | 24 hrs. | ° F | 8 hrs. | 12 hrs | 24 hrs |
| NS* | 290 | 2260 | 170 | 650 | 1690 | 2790 |
| NS | 2080 | 2660 | 200 | 1010 | 2020 | 3980 |
| NS | 2270 | 2840 | 230 | 1670 | 2800 | 4260 |
| 1360 | 3480 | 3310 | 260 | 2040 | 3660 | 5420 |

*Not Set

Compressive strength tests were run on slurries containing calcium lignosulfonate or sulfomethylated lignin. The cement employed in these tests was Lone Star Class H. In these tests, slurries containing retarder to give four hour pumping times on a 12,000' casing schedule were used. The slurries were pumped two hours at a 12,000' casing schedule and placed in autoclaves at four different temperatures to simulate the actual conditions encountered from the top to the bottom of a cement column in a well. The compressive strengths were then determined after 8, 12 and 24 hours according to API publication RP-10B (Section 6). After 8 hours, the slurries containing lignosulfonate had not set at the lower tempertures. However, the slurries containing sulfomethylated lignin were all set with significant strengths. The sulfomethylated lignin slurries consistently showed more rapid strength development throughout these tests.

TABLE VII

Compatibility With Fluid Loss Additives
Compatibility of New Sulfomethylated Lignin and Common Fluid Loss Additives[a]

| Consistometer Readings at 100° F (Poise) Initial | Final | Retarder | Percent Retarder By Wt. Cement | Fluid Loss Additive 1[b] % By Wt. Cement | 2[c] % By Wt. Cement | Sodium Chloride % By Wt. Water | Fluid Loss (cc) |
|---|---|---|---|---|---|---|---|
| 9 | 8 | Sulfomethylated Lignin Calcium | 0.5 | 0.6 | —0— | — — | 44 |
| 9 | 10 | Lignosulfonate | 0.5 | 0.6 | —0— | —0— | 141 |
| 10 | 10 | Sulfomethylated Lignin Calcium | 0.5 | 0.6 | —0— | 18.0 | 98 |
| 10 | 10 | Lignosulfonate | 0.5 | 0.6 | —0— | 18.0 | 188 |
| 12 | 12 | Sulfomethylated Lignin Calcium | 0.5 | —0— | 0.6 | —0— | 38 |
| 10 | 10 | Lignosulfonate | 0.5 | —0— | 0.6 | —0— | 137 |
| 12 | 12 | Sulfomethylated Lignin Calcium | 0.5 | —0— | 0.6 | 18.0 | 82 |
| 11 | 11 | Lignosulfonate | 0.5 | —0— | 0.6 | 18.0 | 154 |

[a]All slurries contained Lone Star Class H Cement, 28% water, and indicated amounts of retarder, Halliburton fluid loss additive, and sodium chloride. After mixing, the slurries were stirred on the Halliburton Consistometer for 20 minutes at 100° F and fluid loss determination conducted at 100 PSI pressure on a 325 mesh screen at the same temperature.
[b]56% HEC (hydroxyethyl cellulose) with 44% CFR-2.
[c]60% HEC, 20% defoamer with 20% CFR-2.

TABLE VIII

Dispersant and Fluid Loss Properties in Gel Cement Slurries
Class H Cement
12% Gel
11.46 gal. water/sack

| Retarder | % Addition (By wt. Cement) | Fann Data Shear Stress lb/ft² at 80° F 600 RPM | 300 RPM | 200 RPM | 100 RPM | Fluid Loss cc/30 Min. 100 PSI No. 50 Whatman Paper | 1000 PSI 325 Mesh Screen |
|---|---|---|---|---|---|---|---|
| Sulfomethylated Lignin | —0— | 1.22 | 1.16 | 1.12 | 1.05 | 190 | 372 |
|  | 0.34 | 0.47 | 0.34 | 0.31 | 0.26 | 132 | 265 |
|  | 0.52 | 0.42 | 0.27 | 0.21 | 0.17 | 104 | 188 |
| Calcium Sodium[a] Lignosulfonate | 0.34 | 0.58 | 0.47 | 0.43 | 0.37 | 149 | 258 |
|  | 0.52 | 0.69 | 0.56 | 0.51 | 0.46 | 113 | 217 |

[a]A mixed calcium-sodium lignosulfonate is used in gel cement slurries instead of simple calcium lignosulfonate due to the tendency of the latter to gel slurries of this type.

Sulfomethylated lignin functions in gel cement slurries as a dispersant and fluid loss additive. Previously, two separate retarders were required; one for non-gel slurries which was calcium lignosulfonate and another for gel slurries which was calcium sodium lignosulfonate.

TABLE IX

Extension with Tartaric Acid
Set Times Obtained with a Mixture of the Sodium Salt of Sulfomethylated Lignin and Tartaric Acid in a 2:1 Weight Ratio[a]

| % Retarder (By Wt. Cement) | Set Times Hours:Minutes API Casing Simulation Tests 16,000' | 18,000' | 20,000' | 22,000' |
|---|---|---|---|---|
| 0.4 | 1:55 | — | — | — |
| 0.5 | 4:20 | — | — | — |
| 0.6 | 5:57 | 1:40 | — | — |
| 0.8 | — | 2:31 | — | — |
| 0.9 | — | 3:43 | — | — |
| 1.0 | — | 4:34 | — | — |
| 1.1 | — | 5:13 | — | 2:00 |
| 1.2 | — | — | 3:43 | — |
| 1.3 | — | — | — | 2:28 |
| 1.6 | — | — | 5:10 | — |
| 1.8 | — | — | 6:32 | 3:12 |
| 2.0 | — | — | — | 3:25 |
| 2.6 | — | — | — | 4:10 |

[a]All slurries consisted of Lone Star Class H Cement, 35% SSA-1, 54% water, and indicated amounts of retarder. SSA-1 is fine silica flour which is added to cement slurries at high temperature to prevent strength retrogression. Over 97% of the silica particles pass through a 200-mesh (U.S. Std. Sieve Series) screen.

TABLE X

Extension of Set Times of Slurries Containing Sulfomethylated Lignin by the Addition of Borax

| Percent Sulfomethylated Lignin (By Wt. Cement) | Percent Borax (By Wt. Cement) | Set Time - Hours:Minutes API Casing Schedule 15,000' | 16,000' |
|---|---|---|---|
| 0.7 | 0.6 | 3:00 | — |
| 0.8 | 0.6 | 4:22 | — |
| 0.9 | 0.6 | 5:12 | — |
| 0.4 | 0.7 | — | 1:54 |
| 0.6 | 0.7 | — | 3:54 |
| 0.8 | 0.7 | — | 5:20 |
| 0.95 | 0.7 | — | 7:10 |

Set times obtained with sulfomethylated lignin can be extended by the addition of boric acid or water soluble salt of boric acid (e.g., salts of ammonia, alkali or alkaline earth metals). This extension makes possible the use of the sulfomethylated lignin retarder at higher temperatures. Examples of extenders of this type are:
1. Boric acid,
2. $Na_2B_4O_7 \cdot 10 H_2O$ (Borax),
3. $Na_2B_5O_8 \cdot 5 H_2O$,
4. $KB_5O_8 \cdot 4 H_2O$,
5. $Li_1B_5O_8 \cdot 5 H_2O$,
6. $NaBO_2 \cdot 4 H_2O$, similar compounds and mixtures thereof.

We claim:

1. A process for sealing at an elevated temperature a zone penetrated by a wellbore using a high efficiency non-gelling hydraulic cement retarder composition having a high degree of predictability for controlling rheology and setting time comprising mixing an aqueous slurry of hydraulic cement with up to about 2% on a dry cement weight basis of a retarder consisting essentially of a low molecular weight sulfoalkylated lignin; wherein the concentration of retarder is calculated to control the setting time of said hydraulic cement to exceed the pumping time; wherein the sulfoalkylated lignin has a molecular weight in the range of about 2,000–10,000 and which is substantially sulfoalkylated on the benzene ring of the lignin molecule in the position ortho to the free phenolic hydroxy group and the sulfonate group is attached to the ortho position by an alkylidene radical having one to three carbon atoms; pumping said hydraulic cement mixture into said zone and maintaining said hydraulic cement mixture in said zone until a high compressive strength is attained.

2. A process for sealing at an elevated temperature a zone penetrated by a wellbore using a high efficiency non-gelling hydraulic cement composition having a high degree of predictability for controlling rheology and setting time comprising mixing an aqueous slurry of hydraulic cement with up to about 2% on a dry cement weight basis of a retarder consisting essentially of at least one water soluble hydroxy carboxylic acid and a low molecular weight sulfoalkylated lignin; wherein the concentration of retarder is calculated to control the setting time of said hydraulic cement to exceed the pumping time; wherein the weight ratio of acid to lignin is in the range of about 1:0.1–5.0; wherein said carboxylic acid is a substantially linear aliphatic acid having at least one terminal carboxyl group in the form of acid, salt of mixtures thereof; wherein said sulfoalkylated lignin has a molcular weight in the range of about 2,000–10,000 and which is substantially sulfoalkylated on the benzene ring in the lignin molecule in the position ortho to the free phenolic hydroxy group and the sulfonate group is attached to the ortho position by an alkylidene radical having one to three carbon atoms; pumping said hydraulic cement mixture into said zone without gelation and maintaining said hydraulic cement mixture in said zone until a high compressive strength is attained.

3. In a process for cementing a zone at an elevated temperature by pumping an aqueous hydraulic cement slurry into said zone, the improvement of controlling the setting time of said cement and preventing gelation of said cement by mixing with said hydraulic cement a high efficiency non-gelling retarder consisting essentially of a mixture of at least one water soluble hydroxy carboxylic acid and a low molecular weight sulfoalkylated lignin; wherein the concentration of retarder is calculated to control the setting time of said hydraulic cement to exceed the pumping time; wherein the weight ratio of said acid to lignin is in the range of about 1:0.1–5.0; wherein the carboxylic acid is a substantially linear aliphatic acid having at least one terminal carboxyl group in the form of acid, salt or mixtures thereof; wherein said sulfoalkylated lignin has a molecular weight in the range of about 2,000–10,000 and which is substantially sulfoalkylated on the benzene ring in the lignin molecule in the position ortho to the free phenolic hydroxy group and the sulfonate group is attached to the ortho position by an alkylidene radical having one to three carbon atoms.

* * * * *